United States Patent
Devenney et al.

(10) Patent No.: US 6,315,923 B1
(45) Date of Patent: Nov. 13, 2001

(54) STORAGE PHOSPHORS

(75) Inventors: Martin Devenney, Mt. View; Earl Danielson, Palo Alto, both of CA (US); Paul Leblans, Kontich (BE)

(73) Assignees: Symyx Technologies, Inc; AGFA-Gevaert, N.V., both of Santa Clara, CA (US)

( * ) Notice: Subject to any disclaimer, the term of this patent is extended or adjusted under 35 U.S.C. 154(b) by 0 days.

(21) Appl. No.: 09/438,236

(22) Filed: Nov. 12, 1999

Related U.S. Application Data
(60) Provisional application No. 60/108,094, filed on Nov. 12, 1998.

(51) Int. Cl.[7] .............................. C09K 11/80; C09K 11/78
(52) U.S. Cl. ................................ 252/301.4 R; 250/483.1; 250/484.2; 250/484.4
(58) Field of Search .............. 252/301.4 R; 250/483.1, 250/484.2, 484.4

(56) References Cited

U.S. PATENT DOCUMENTS

| | | | |
|---|---|---|---|
| 4,258,264 | 3/1981 | Kotera et al. | 250/484 |
| 4,757,232 * | 7/1988 | Berkstresser et al. | 313/468 |
| 4,822,696 * | 4/1989 | Lammers et al. | 482/690 |
| 4,829,188 | 5/1989 | Shinomiya et al. | 250/483.1 |
| 4,857,741 | 8/1989 | Yokota et al. | 250/486.1 |
| 4,959,174 | 9/1990 | Nakajima et al. | 252/301.6 R |
| 5,037,577 * | 8/1991 | Yamanoi et al. | 252/301.4 R |
| 5,104,573 | 4/1992 | Ono et al. | 252/301.4 F |
| 5,343,316 | 8/1994 | Morimoto et al. | 359/50 |
| 5,391,884 | 2/1995 | Sieber et al. | 250/484.2 |
| 5,514,298 | 5/1996 | Terrell et al. | 252/301.4 |

FOREIGN PATENT DOCUMENTS

| | | |
|---|---|---|
| 292616 * | 5/1992 | (EP) . |
| 0 292 616 B1 | 5/1992 | (EP) . |
| WO 00/17413 | 3/2000 | (WO) . |

OTHER PUBLICATIONS

Pelletier–Allard, N., et al., Journal of Luminescence, vol. 62, No. 2, pp. 61–67 (1994) no month.

Brenier, A., et al., Journal of Luminscence, vol. 54, No. 5, pp. 271–277 (1993) no month.

Ohno, K. et al., Journal of Electrochemical Society, vol. 134, No. 8, pp. 2072–2076 (1987) no month.

* cited by examiner

Primary Examiner—C. Melissa Koslow

(57) ABSTRACT

Storage phosphors comprising an activated garnet host comprising oxygen and combined elements satisfying the relationship $$Ln_{3+\delta}M_{5-\delta}:cQ$$

wherein Ln is an element selected from the group consisting of Gd, La, Lu, Y and combinations thereof; M is an element selected from the group consisting of Al, Ga, Sc, Fe and combinations thereof; Q is selected from the group consisting of terbium, samarium, thallium, indium, europium, ytterbium and combinations thereof; δ is greater lo than or equal to minus 0.5, but less than or equal to 0.5 (i.e., $-0.5 \leq \delta \leq 0.5$); and c is an amount sufficient to produce a phosphor that exhibits a higher luminescence emission intensity than said phosphor absent Q when, after first being exposed to penetrating radiaton, the phosphor is stimulated by light of a wavelength ranging from 600 to 1200 nm or thermally. These phosphors can store and subsequently emit light based on several different types of irradiation, including x-ray, ultraviolet, electrons, alpha or beta particles or neutrons.

16 Claims, 2 Drawing Sheets

STORAGE PHOSPHORS

The present application claims the benefit of co-pending U.S. provisional patent application 60/108,094 filed Nov. 12, 1998. The entirety of this application is incorporated herein by reference for all purposes.

FIELD OF THE INVENTION

The present invention relates to phosphors. The phosphors of this invention show particularly useful properties for the field of storage phosphors and radiographic imaging, including penetrating radiation storage phosphors and penetrating radiation imaging, such as X-ray storage phosphors and X-ray imaging.

BACKGROUND OF THE INVENTION

Phosphor materials are well known for various uses. One such use is as X-ray storage phosphors. An X-ray storage phosphor exhibits photostimulated luminescence after exposure to an X-ray dose of radiation and subsequent exposure to an excitation source, such as a light source (e.g., visible light, infrared). Thus, the phosphor has the ability to store some of the X-rays it is initially dosed with so that it can emit that energy later. The secondary excitation needed to cause the emission of radiation in storage phosphors is commonly referred to as stimulation radiation. Storage phosphors are used in imaging plates to acquire images in a digital format and to produce images that may be electronically displayed on a screen or printed. The storage phosphor is typically incorporated into a binder in the imaging plates, with the binder applied to a suitable support. There are several known methods for recording and reproducing an X-ray pattern using X-ray storage phosphors. See, e.g., U.S. Pat. Nos. 5,514,298 and 4,258,264, each of which is incorporated in their entirety herein by reference.

It would be desirable to identify useful storage phosphors having relatively high densities. Theoretically, phosphors having high densities are capable of producing a useful phosphor layer that is thinner than is currently in use. Higher density phosphors provide relatively high absorption of penetrating radiation, which potentially results in higher image resolution. One prototypical X-ray storage phosphor, BaFBr:Eu, has the relatively low density of about 4.96 g/cc.

Phosphors commonly comprise a host compound that may be doped with an activator element. For example, U.S. Pat. No. 5,391,884 discloses a gadolinate host activated with either terbium or terbium and samarium. Other gadolinium-hosted phosphors are known, see, e.g., U.S. Pat. Nos. 4,959,174, 4,829,188 and 4,857,741. Certain compositions are known as direct conversion x-ray phosphors, but not as storage phosphors. See U.S. Pat. No. 4,822,696.

There continues to be a need for materials that are suitable storage phosphors, particularly those having higher densities.

SUMMARY OF THE INVENTION

In accord with the present invention, a storage phosphor has been discovered, comprising a composition characterized by the general formula:

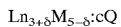

where

Ln is selected from the group consisting of Gd, La, Lu, Y and combinations thereof;

M is selected from the group consisting of Al, Ga, Sc, Fe and combinations thereof;

O is oxygen;

Tb is terbium;

Z is selected from the group consisting of Tl, Sm, Yb, In, Eu and combinations thereof;

x is greater than or equal to zero, but less than or equal to 0.05 (i.e., $0 \leq x \leq 0.05$);

y is greater than or equal to zero, but less than or equal to 0.05 (i.e., $0 \leq y \leq 0.05$);

δ is greater than or equal to minus 0.5, but less than or equal to 0.5 (i.e., $-0.5 \leq \delta \leq 0.5$)

and wherein the sum of x and y is not zero.

This phosphor is useful for storing and thereafter reading out penetrating radiation from a variety of sources, including X-rays, ultraviolet rays, electrons, alpha particles, beta particles or neutrons.

This invention also discloses a phosphor comprising an activated garnet host comprising oxygen and combined elements satisfying the relationship $$Ln_{3+\delta}M_{5-\delta}:cQ$$

wherein Ln, δ and M are as defined above; and Q is selected from the group consisting of terbium, samarium, thallium, indium, europium, ytterbium and combinations thereof; and c is an amount sufficient to produce a phosphor that exhibits a higher luminescence emission intensity than said phosphor absent Q when, after first being exposed to penetrating radiation, the phosphor is stimulated by light of a wavelength ranging from 600 to 1200 nm or thermally. In this aspect, c is a mole percent with respect to Ln and is in the range of greater than zero, but less than or equal to 3 (i.e., $0 < c \leq 3$). In a preferred embodiment, Q is a combination of terbium and thallium, which are present in a ratio of about one to one, and c is about 0.1 mole percent with respect to Ln.

Another aspect of this invention is a method for storing an image produced by exposure to penetrating radiation and releasing the stored image, comprising imagewise exposing a storage screen to radiation of a first wavelength, said storage screen comprised of a storage phosphor comprising oxygen and combined elements satisfying the relationship

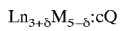

wherein Ln, M and Q are as defined above. In this aspect, c is a mole percent with respect to the other side of the formula (e.g., any of the host ions) and is in the range of greater than zero, but less than or equal to 3 (i.e., $0 < c \leq 3$). After the storage screen has been exposed to the penetrating radiation, the storage screen is exposed to radiation of a second wavelength, thereby causing emission of a third wavelength. The emitted radiation of the third wavelength is then collected and used to produce an image representative of the image pattern initially stored on the image screen.

The storage phosphors of this invention are made using methods known to those skilled in the art. One method of making the phosphors of this invention is a sol-gel technique where the starting materials are mixed in a solvent in the desired stoichiometric ratios, placed in or on a substrate and then heat-treated.

DETAILED DESCRIPTION OF THE INVENTION

Figure 1:
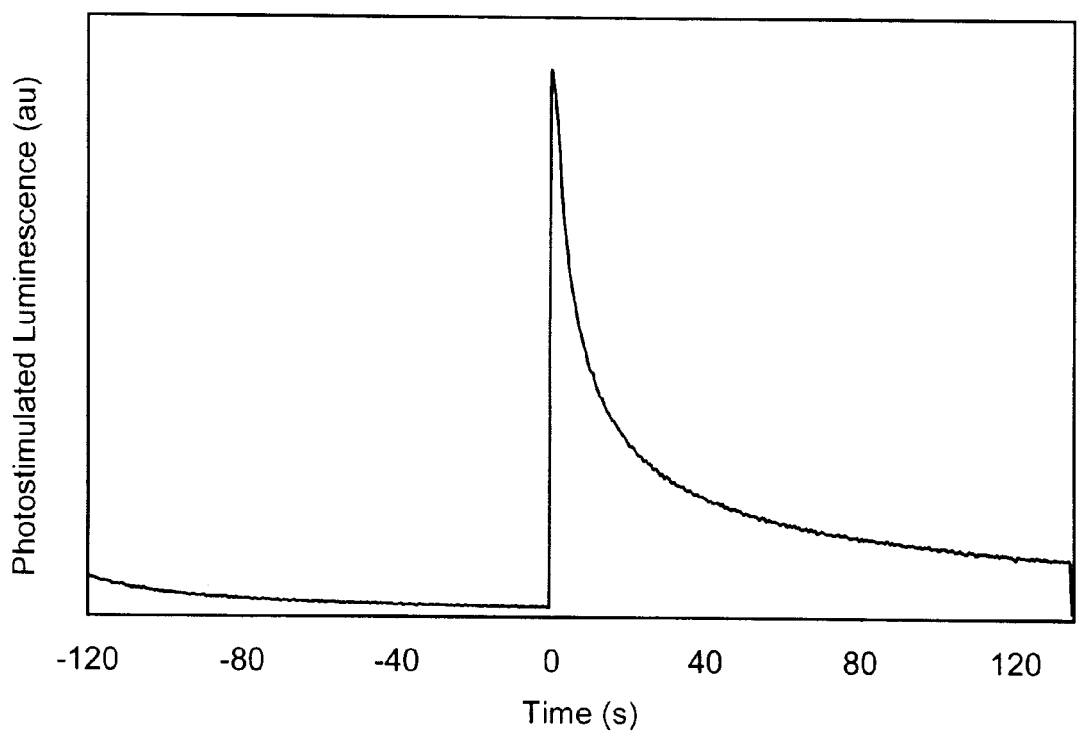
FIG. 1 is an example of the time dependent photostimulated luminescence decay of the x-ray irradiated sample described in Example 3 (photostimulated at time equals zero)

The present invention is for a general class of storage phosphors that crystallize in the garnet structure type (see U.S. Pat. No. 4,822,696) comprising a host that can be characterized by the general formula $Ln_{3+\delta}M_{5-\delta}O_{12}$ where Ln is an element selected from the group consisting of Gd, La, Lu, Y and combinations thereof and M is selected from the group consisting of Al, Ga, Sc, Fe and combinations thereof. Some of the compositions within this formula are known as direct conversion phosphors, but not as storage phosphors. This application is limited to storage phosphors in those cases where the composition is known.

In a more preferred embodiment the Ln portion of the formula can be further characterized by the general formula $Lm_{1-z}Y_z$ where Lm is selected from the group consisting of Gd, La or Lu and z is greater than or equal to zero, but less than or equal to 0.02 (i.e., $0 \leq z \leq 0.02$). In this preferred embodiment, a portion of Lm can be replaced by yttrium without substantially losing absorption. The storage phosphors of this invention are of relatively high density, in the rage of from about 7.0 g/cc to about 7.6 g/cc. This relatively high density results in a relatively high absorption, which potentially results in better image quality for digital radiography.

In a further preferred embodiment, the M portion of the formula can be further characterized by the general formula $Mm_{1-a}Mp_a$ where Mm and Mp are independently selected from the group consisting of Ga, Al, Fe and Sc; and a is a number from 0 to about 1.0, but preferably in the range of from about 0 to about 0.5. The garnets exist with Fe and/or Sc as small trivalent ions.

In more specific embodiments, the phosphor host is represented the by the formula $Gd_{3+\delta}(Ga_{1-a}Al_a)_{5-\delta}O_{12}$, where a is a number from 0 to about 1.0. In another embodiment a is in the range of from 0 to 0.5 or in the range of from 0 to about 0.1. Thus, the ratio of gallium to aluminum may range from 1:0 to about 0:1. In even more specific embodiments, the ratio of gallium to aluminum ranges from about 0.95:0.05 to about 0.05:0.95 or about 1:1.

The activator is selected from the group consisting of terbium, samarium, thallium, indium, europium, ytterbium and combinations thereof. If only one activator is used, the activator is preferably selected from the group consisting of terbium, samarium and europium. However, preferably, there is a combination of activators. The preferred combination of activators is either terbium and thallium or terbium and samarium or terbium and ytterbium. The ratio of one activator to another activator can range from about 1:100 to about 100:1. In other embodiments, the ratio of one activator to another approaches 1:1.

In more preferred embodiments, the phosphor host can be characterized by the general formula $(Lm_{1-z}Y_z)_{3+\delta}M_{5-\delta}O_{12}$ or by the general formula $Ln_{3+\delta}(Mm_{1-a}Mp_a)_{5-\delta}O_{12}$ or by the general formula $(Lm_{1-z}Y_z)_{3+\delta}(MM_{1-a}Mp_a)_{5-\delta O12}$ where each of the symbols is as defined above. In yet even more preferred embodiments, the garnet host can be represented by the general formula $(Lm_{1-z}Y_z)_{3+\delta}(MM_{1-a}Al_a)_{5-\delta}O_{12}$ or by the general formula $(Gd_{1-z}Y_z)_{3+\delta}(Mm_{1-a}Al_a)_{5-\delta}O_{12}$ or by the general formula $(Gd_{1-z}La_z)_{3+\delta}(MM_{1-a}Al_a)_{5-\delta}O_{12}$ or by the general formula $(Gd_{1-z}Y_z)_{3+\delta}Ga_{5-\delta}O_{12}$. The garnet host can be activated by any of the activators listed above, most preferable with terbium or terbium with another listed activator.

The activator is provided in amount that is sufficient to produce a phosphor that exhibits a higher luminescence emission intensity than said phosphor absent the activator when, after first being exposed to penetrating radiation (such as ultraviolet, X-ray, electron beam, etc.), the phosphor is stimulated by light of a wavelength ranging from 600 to 1200 nm. The activator is present in the range of greater than zero to about 3 mole percent of the phosphor host. In other aspects, the activator is present in an amount of from about 0.001 to about 3.0 or from about 0.01 to about 2.0 or from about 0.1 to about 1.0 mole percent of the phosphor host. The amount of activator refers to a single activator alone and not a combination of activators. Thus, when two activators are present, each activator will be present in a mole percent amount with respect to the amount of Ln. For example, when a combination of thallium and terbium is used as the activator, each may be present in an amount of from about 0.001 to about 3.0 mole percent of Ln.

Methods and techniques commonly used for making phosphors are applicable to the phosphors of the present invention. See, for example, U.S. Pat. Nos. 5,517,034, 4,959,174 and 5,391,884, each of which is incorporated in their entirety herein by reference. In general, solutions containing the starting materials are mixed together in the desired stoichiometric amount. The mixture is then placed on or in a substrate and then heated for an extended period. The heating temperature is in the range of from about 500° C. to about 1700° C. The heating atmosphere can be either oxidizing (e.g., air), strongly oxidizing (e.g., oxygen rich), reducing (e.g., hydrogen), slightly reducing (e.g., nitrogen) or vacuum. The period of time for heating is in the range of from about 1 hour to about 48 hours.

After exposure of the storage phosphors to the penetrating radiation, irradiation of the phosphors of this invention by radiation of a second wavelength will result in these phosphors emitting radiation of a third wavelength. The phosphors of the present invention can cause photostimulated luminescence in the green and/or blue and/or near ultraviolet region of the spectrum with stimulation from a second wavelength in a range of 600–1200 nm, preferably at a wavelength provided by commonly available lasers.

The phosphors of the present invention may be used in an imaging plate in a process for taking X-ray images of patients. The imaging plate consists of a support and a fluorescent layer containing the phosphors of this invention. The imaging plate is excited by a pattern of radiation of a first wavelength, such as, for example X-rays, which has first been transmitted through a patient. After passing through the patient, the radiation impinges upon the imaging plate and is absorbed by the phosphor layer or phosphor-containing layer in proportion to the intensity of the radiation. The phosphor or phosphor-containing layer is then exposed to radiation of a second wavelength, causing o emission of a third wavelength of radiation having an intensity pattern representative of the stored image. A photomultiplier tube or other collection device then collects this third wavelength of radiation. The method of release of the radiation is not critical and includes, scanning the phosphor layer with a laser having a wavelength of the second wavelength that is appropriate to cause the phosphor to emit radiation of a third wavelength or heating. The light released from the phosphor due to excitation by the laser is then collected. The collected signal is then amplified, digitized and manipulated using various image processing algorithms and then displayed on a cathode ray tube or other display panel or recorded on an image recording medium. U.S. Pat. No. 4,822,696, which is incorporated in its entirety herein by reference, discusses X-ray conversion screens.

The phosphors of this invention are useful for the storage and read out of charge from radiation sources other than x-ray, such as high-energy radiation, including ultraviolet, electrons, alpha or beta particles or neutrons. Thus, the phosphors are useful as detectors for any penetrating radiation. The phosphors are especially useful for neutron detection.

The photostimulable layer includes ingredients known to those skilled in the art, including binders to impart structural coherence. The support for the photostimulable layer can be of any conventional type, and can be either rigid or flexible. Any of or combination of conventional intensifying screen features may be employed.

EXAMPLES

The libraries discussed below were generally prepared using the solution-based techniques disclosed in U.S. patent application Ser. No. 09/156,827, filed Sep. 18, 1998, incorporated herein by reference.

Example 1
Preparation of the Substrate

The substrate was a silicon wafer (3" diameter) that was chemically modified with an organosilane layer, such as $CH_3(CH_2)_nSiCl_3$ where $0 \leq n \leq 17$. The organosilane reagent was chosen to lend particular wetting characteristics to the substrate surface. The substrate was sonicated for 15–20 minutes in isopropanol, rinsed with distilled and de-ionized water, dried under a nitrogen gas jet and heated at 120° C. for about 20–30 minutes. After cooling, the substrate was placed in a 5% v/v solution of octyltrichlorosilane in methylene chloride, then removed from the methylene chloride, washed with methanol, then dried under a nitrogen gas jet. This entire process was repeated once by first reimmersing the substrate in the octyltrichlorosilane/methylene chloride solution. After the substrates were chemically modified through silanization, an array of regions was created by bead blasting the substrate with 50 μm alumina grit through a stainless steel mask which consisted of an array of 12×12 holes each 3.0 mm diameter with a center to center spacing of 4.0 mm. The substrate was bead blasted for enough time to remove about 4–6 μm of material from the silicon substrate. After bead blasting, the silicon wafer was a plurality of round 3 mm diameter slightly roughened regions with sufficient spacing so that the materials between regions would not intermix. The presence of the silane layer in the regions of the wafer that was not bead blasted ensured confinement of the component solutions in each region.

Once the substrate was prepared, solutions of the starting components were deposited in individual regions on the substrate.

Preparation of Stock Metal Alkoxide Solutions

Lanthanum isopropoxide (0.9587 g; 3.03×10$^{-3}$ mol) and 2,4-pentanedione (0.152 g, 1.5×10$^{-3}$ mol) was refluxed in 2-methoxyethanol (7.0 mls) for 6 hours in an argon atmosphere. Two solutions each of gadolinium isopropoxide (1.0121 g; 3.17×10$^{-3}$ mol) and gallium isopropoxide (0.7462g; 3.02 x 10$^{-3}$ mol) are individually refluxed in 2-methoxyethanol (7.0 mls each) for 6 hours in an argon atmosphere. The refluxed solutions are transferred to volumetric flasks (10.0 ml) and to each solution is further added 2-methoxyethanol to bring the total volume to 10.0 mls.

Preparation of Component Mixtures

The term "component mixtures" is used to mean mixtures of components. The following component mixtures were prepared by dilution of the stock solutions described above.

Component 1 contains 2.475 mls of the lanthanum isopropoxide (7.5×10$^{-4}$ mol) in 2-methoxyethanol to which is added triethanolamine (0.561 g, 3.75×10$^{-4}$ mol) and further diluted with 2-methoxyethanol (0.474 mls). Component 2 contains 2.475 mls of the gadolinium isopropoxide (7.5×10$^{-4}$ mol) stock solution to which is added triethanolamine (0.561 g, 3.75×10$^{-4}$ mol) and further diluted with 2-methoxyethanol (0.474 mls). Component 3 contains 4.14 mls of the gallium isopropoxide (6.25×10$^{-3}$ mol) stock solution to which is added triethanolamine (0.935 g, 6.25×10$^{-4}$ mol) and further diluted with 2-methoxyethanol (0.775 mls). Component 4 contains component 2 (1.5 mls) and component 3 (2.5 mls) giving a solution comprising 3 parts Gd to 5 parts Ga. Component 5 contains component 2 (0.75 mls), component 1 (0.75 mls) and component 3 (2.5 mls) giving a solution comprising 1.5 parts Gd, 1.5 parts La and 5 parts Ga.

Each of the component mixtures summarized in the following table are prepared from the respective nitrate salts dissolved in 2-methoxyethanol (1.0 mls).

| Component 6 | Component 7 | Component 8 | Component 9 | Component 10 | Component 11 |
|---|---|---|---|---|---|
| Tb(NO$_3$)$_3$.6H$_2$O, 6.36 × 10$^{-4}$ g, 1.406 × 10$^{-6}$ mol | Tb(NO$_3$)$_3$.6H$_2$O, 6.36 × 10$^{-4}$ g, 1.406 × 10$^{-6}$ mol Sm(NO$_3$)$_3$.6H$_2$O, 6.25 × 10$^{-4}$ g, 1.406 × 10$^{-6}$ mol | Tb(NO$_3$)$_3$.6H$_2$O, 6.36 × 10$^{-4}$ g, 1.406 × 10$^{-6}$ mol Tl(NO$_3$)$_3$.3H$_2$O, 6.25 × 10$^{-4}$ g, 1.406 × 10$^{-6}$ mol | Tb(NO$_3$)$_3$.6H$_2$O, 6.36 × 10$^{-4}$ g, 1.406 × 10$^{-6}$ mol Yb(NO$_3$)$_3$.5H$_2$O, 6.32 × 10$^{-4}$ g, 1.406 × 10$^{-6}$ mol | Tb(NO$_3$)$_3$.6H$_2$O, 6.36 × 10$^{-4}$ g, 1.406 × 10$^{-6}$ mol Eu(NO$_3$)$_3$.6H$_2$O, 6.27 × 10$^{-4}$ g, 1.406 × 10$^{-6}$ mol | Tb(NO$_3$)$_3$.6H$_2$O, 6.36 × 10$^{-4}$ g, 1.406 × 10$^{-6}$ mol In(NO$_3$)$_3$.5H$_2$O, 5.5 × 10$^{-4}$ g, 1.406 × 10$^{-6}$ mol |

| Component 12 | Component 13 | Component 14 | Component 15 | Component 16 |
|---|---|---|---|---|
| Tb(NO$_3$)$_3$.6H$_2$O 6.36 × 10$^{-3}$ g, 1.406 × 10$^{-5}$ mol; Sm(NO$_3$)$_3$.6H$_2$O, 6.25 × 10$^{-3}$ g, 1.406 × 10$^{-5}$ mol | Tb(NO$_3$)$_3$.6H$_2$O 6.36 × 10$^{-3}$ g, 1.406 × 10$^{-5}$ mol; Tl(NO$_3$)$_3$.3H$_2$O, 6.25 × 10$^{-3}$ g, 1.406 × 10$^5$ mol | Tb(NO$_3$)$_3$.6H$_2$O 6.36 × 10$^{-3}$ g, 1.406 × 10$^{-5}$ mol; Yb(NO$_3$)$_3$.5H$_2$O, 6.32 × 10$^{-3}$ g, 1.406 × 10$^{-5}$ mol | Tb(NO$_3$)$_3$.6H$_2$O 6.36 × 10$^{-3}$ g, 1.406 × 10$^{-5}$ mol; Eu(NO$_3$)$_3$.6H$_2$O, 6.27 × 10$^{-3}$ g, 1.406 × 10$^{-5}$ mol | Tb(NO$_3$)$_3$.6H$_2$O 6.36 × 10$^{-3}$ g, 1.406 × 10$^{-5}$ mol; In(NO$_3$)$_3$.5H$_2$O, 5.5 × 10$^{-3}$ g, 1.406 × 10$^{-5}$ mol |

Automated Synthesis of Combinatorial Array in Microtiterplates

The desired nominal stoichiometry was achieved through the use of dispensing gradients of the individual component mixtures. In this example the combinatorial array is first created in microtiter plates using automated solution dispensing. The polypropylene microtiter plates contain 8 rows×12 columns wherein each region in the array is physically separated and has a volume capacity of 300 μl per region.

Using an automated liquid dispensing system, 12 rows containing 11 regions each (132 regions) are created in two microtiterplates. Component 4 is dispensed in each row in a gradient from 30 to 0 $\mu l$ with a decrement of 3 $\mu l$ per well. Component 5 is dispensed in an opposing gradient from 0 to 30 $\mu l$ across each row with an increment of 3 $\mu l$ per well. The volume of liquid in each region is thus constant at 30 $\mu l$. This effectively creates the nominal stoichiometric composition of $(Gd_{1-x}La_x)_3Ga_5$ where x=0 to 0.5 across each row in the array. The dopant ions are introduced using automated solution dispensing. To each of the 11 regions in row 1 is added 2 $\mu l$ from component 6. 2 $\mu l$ from components 7 through 16 are added respectively to each of the subsequent rows in the array. Row 12 in the array contains no deliberately added dopant. The concentration of each of the dopants in rows 1 through 6 is at approximately 0.11 mol % with respect to gadolinium plus lanthanum. The concentration of each of the dopants in rows 7 through 11 is at approximately 1.1 mol % with respect to gadolinium plus lanthanum. To ensure intimate mixing of the components in each region of the array, a gentle stream of argon is used to agitate each well. The array on the microtiterplates is recreated on the silicon substrate by manually pipetting 2.2 $\mu l$ of solution from each region in the microtiterplates to a corresponding region on the substrate.

The substrates is covered for a period of approximately 24 hours after which the cover is removed and the samples allowed to dry in the ambient atmosphere for a further 24 hours.

Processing of the substrate took place in a box furnace in air. The sample was heated from room temperature at a rate of 1° C./min. to 120° C. and maintained at that temperature for 2 hours followed by heating at 1° C./min. to 180° C., holding for 2 hours then heated at 1° C./min to 500° C, holding for 6 hours followed by heating to 1100° C. at 2° C./min and holding for 3 hours after which the substrate is cooled to room temperature at the natural cooling rate of the furnace.

X-ray diffraction indicated a single phase material in each of the regions in row 1 identified as the garnet structure type. The X-ray diffraction pattern from region 1 matched the indexed diffraction pattern assigned to $Gd_3Ga_5O_{12}$. A linear increase in d spacing was observed for each of the subsequent regions in row 1 indicative of lanthanum substitution into the gadolinium site in the garnet. The entire array was exposed to ultraviolet radiation (254 nm). Photostimulated luminescence was observed from all of the regions containing terbium, the strongest signal being detected from rows 1 through 6 that contained terbium at a lower concentration than rows 7 through 11. Row 12 that did not contain any deliberately added dopants was found not to exhibit any photostimulated luminescence.

Example 2

The example is a bulk sample in a follow up a material identified in Example 1. Gadolinium (III) nitrate hexahydrate (1.354 g; 2.999×$10^{-3}$ mol) lanthanum (III) nitrate hexahydrate (1.299 g; 2.999×$10^{-3}$ mol), gallium (III) nitrate hydrate (2.5574 g; 1×$10^{-2}$ mol), terbium (III) nitrate hexahydrate (0.00135 g; 3×$10^{-6}$ mol) and thallium (III) nitrate trihydrate (0.00133 g ; 3.0×$10^{-6}$ mol) were dissolved in concentrated nitric acid (25 ml) with heating at 160° C. Heating was continued for 4 hours until the solution was reduced to dryness.

The sample was heated in an oven at 120° C. for 24 hours, ground to a fine powder, then further heated to 1000° C. at a rate of 10° C./min with intermediate heating steps at 400° C. for 12 hrs, 500° C. for 9 hours and 900° C. for 9 hours. The sample was tested for photostimulation properties and was found to exhibit some photostimulated luminescence after exposure to X-ray radiation and subsequent stimulation with a helium/neon (633 nm) laser.

Example 3

The sample from Example 2 was further heated to 1200° C. at rate of 10° C./min and the elevated temperature maintained for 12 hours. Powder X-ray diffraction on the sample indicated a single phase material identified as the garnet structure type. Comparison of the diffraction pattern with the indexed pattern for $Gd_3Ga_5O_{12}$ show increased d-spacing. The unit cell dimensions indicate the phase is best represented as $(Gd_{0.5}La_{0.5})_3Ga_5O_{12}$. The sample was tested for photostimulation properties and was found to exhibit stronger photostimulated luminescence in comparison to Example 2 after exposure to X-ray radiation and subsequent stimulation with a helium/neon (633 nm) laser.

Example 4

Gadolinium (III) nitrate hexahydrate (2.7054 g; 5.994× $10^{-3}$ mol) lanthanum (III) nitrate hexahydrate (2.5955 g; 5.994×$10^{-3}$ mol), gallium (III) nitrate (5.1148 g; 2×$10^{-2}$ mol), terbium (III) nitrate hexahydrate 0.00135 g; 3×$10^{-6}$ mol) and thallium (III) nitrate (0.00133 g ; 3.0×$10^{-6}$ mol) were dissolved in concentrated nitric acid (25 ml) with heating at 170° C. and the solution reduced to dryness over 4 hours. The sample was heated at 120° C. for 24 hours followed by heating at a rate of 10° C./min to 400° C. and holding for 12 hours. The sample was then reground and heated to 1000° C. at a rate of 10° C./min and holding at the elevated temperature for 6 hours followed by heating to 1200° C. for 12 hours.

X-ray diffraction shows the predominant phase to be that of the garnet structure type with small amounts of another oxide phase identified as the $LaGaO_3$. The sample was tested for photostimulation properties and was found to exhibit some photostimulated luminescence after exposure to X-ray radiation and subsequent stimulation with a helium/neon (633 nm) laser.

Measurement of Photostimulation Properties

Measurements of the photostimulation decay characteristics were measured with the bulk powder of Example 2 and the library of Example 1. The bulk powder sample was deposited and compacted into an aluminum holder (7 mm diameter×2 mm deep). The library from Example 1 was tested on the substrate. All samples were mounted on a computer controlled x, y, z, theta stage for automated data acquisition. Prior to measurement, the samples were irradiated with an X-ray source (S. S. White, 75 kV, 10 mA) filtered with 5 mm of aluminum to sharpen the radiation. The accumulated exposure measured by film dosimetry was on the order of 0.1 mR. All X-ray exposure and subsequent measurements were performed in a light-tight enclosure.

Photostimulation decays were performed with the following system. The samples were mounted onto a computer controlled x,y,z and theta stage and exposed to the X-ray source as described above. After X-ray exposure the photostimulated luminescence was excited with a gas or diode laser (e.g. He—Ne Meles-Griot 05-LHP-991 Microlasers L4635, L4785). In the case of the He—Ne laser (633 nm), the beam was passed through an optical filter (Schott OG590) to remove residual high energy plasma lines and beam expanded (~10×). The diode lasers (635 and 780 nm) were provided with beam collimation (~2 mm) and required no further optical conditioning. A mechanical chopper (Palo Alto Research 200) was used to modulate the laser beam (200 Hz–1 kHz) and provide a reference signal for phase sensitive detection. The excitation beam was passed through an electronic shutter to control exposure of the sample, mounted within a light-tight enclosure, to the stimulation beam. An aperture positioned in front of the sample (~2 mm diameter) defined the beam size incident upon the sample. Photostimulation irradiances of approximately 2–8 mW were used for all analyses. The photostimulated luminescence was collected with a pair of off-axis parabolic mirrors, passed through suitable bandpass filter(s) (e.g. 400 nm, FWHM=60 nm), holographic notch laser rejection filter (Kaiser Assocs.) and focussed onto a photomultiplier (Hamamatsu R928) operating in current mode. The output of the photomultiplier was read out with either a picoammeter (Keithley 485) or in a phase-sensitive manner with a lock-in amplifier (Stanford Research SR830). The use of the phase-sensitive detection discriminates against any residual afterglow from the sample. The time-dependent photostimulated luminescence for the Example 2 sample (or an Example 1 library element) was collected and stored to computer for subsequent analysis. By automated control of the sample stage, photostimulation decays for all elements within a library are obtained. FIG. 1 is a time-dependent photostimulated luminescence decay for the bulk powder of Example 2.

Figure 2:
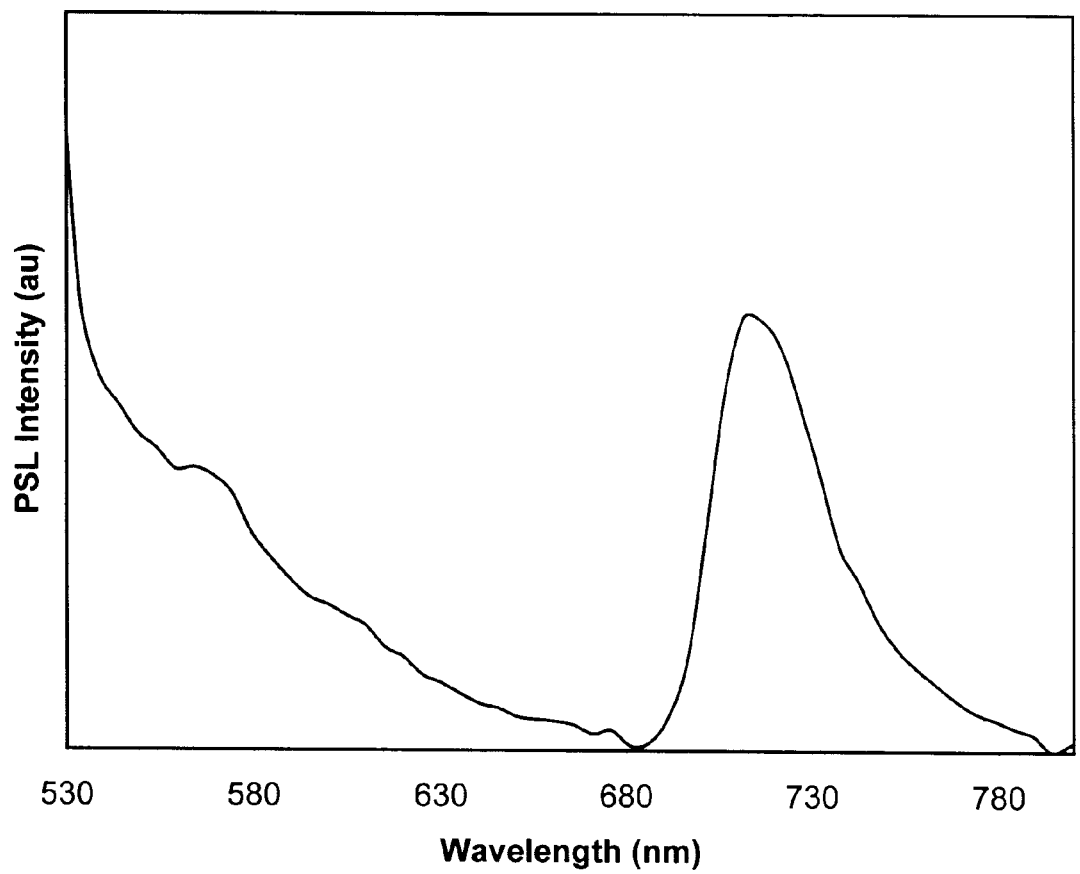
FIG. 2 is the photostimulation spectrum recorded subsequent to X-ray exposure from the phosphor described in Example 3.

Photostimulation spectra were measured with the following system. The output of a 100 watt quartz-iodine lamp was filtered to remove IR light ($\lambda > 1000$ nm) and focussed into a fiber optic cable by means of an elliptical reflector. The output of the fiber optic was optically coupled (f-matched) to a scanning monochromator (Acton SP-150; 1200 l/mm, 500 nm blaze grating) under computer control. The output of the monochromator was passed through a suitable long-wave pass filter (e.g. 500 nm) to eliminate higher orders of light, collected with a quartz lens (f/2) and softly focussed onto the sample. By proper adjustment of the irradiance at the sample, only a small portion of the stored energy was released. The irradiance used was determined by scanning the photostimulation from both high to low and low to high energy and adjusting the value to a level that prevented depletion of the stored energy during the spectral collection time interval. The photostimulated emission was collected from the sample by means of a quartz lens (f/2), bandpass filtered ($\lambda_{peak}$=400 nm, FWHM=60 nm) and softly focussed onto a photomultiplier (Hamamatsu R928) operating in current mode. The output of the photomultiplier was recorded with a picoammeter (Keithley 485) with a computer (i.e., GPIB) interface and stored in computer memory. To correct for the wavelength dependence of the photostimulation beam, a reference signal was obtained by using a quartz beam splitter to deliver a small fraction of the stimulation beam to a second photomultiplier (Hamamatsu R928). The output of the reference photomultiplier was also recorded with a picoammeter (Keithley 6517A) with a GPIB interface and stored in computer memory. The resulting reference signal was spectrally corrected for the photomultiplier's response. The stimulation spectra are calculated and displayed as the ratio of the stimulated emission minus dark to the spectrally corrected reference signal minus dark. FIG. 2 shows the stimulation spectrum of the bulk powder in Example 2 using this technique.

It is to be understood that the above description is intended to be illustrative and not restrictive. Many embodiments will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patents, patent applications and publications, are incorporated herein by reference for all purposes.

What is claimed is:

1. A storage phosphor comprising an activated garnet host comprising oxygen and combined elements satisfying the relationship:

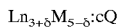

$$Ln_{3+\delta}M_{5-\delta}:cQ$$

wherein Ln is an element selected from the group consisting of Gd, La, Lu, Y and combinations thereof, M is an element selected from the group consisting of Al, Ga, Sc, Fe and combinations thereof;

Q is a combination of terbium and thallium;

$\delta$ is greater than or equal to minus 0.5, but less than or equal to 0.5; and c is an amount sufficient to produce a phosphor that exhibits a higher luminescence emission intensity than said phosphor absent Q when, after first being exposed to penetrating radiation, the phosphor is stimulated by light of a wavelength ranging from 600 to 1200 nm.

2. The phosphor of claim 1, wherein c is in the range of greater than zero, but less than or equal to 3 mole percent of the amount of Ln.

3. The phosphor of claim 1, where the ratio of terbium to thallium is 1 to 1.

4. The phosphor of claim 1, where Ln is characterized by the general formula $Lm_{1-z}Y_z$ where Lm is selected from the group consisting of Gd, La or Lu and z is greater than or equal to zero, but less than or equal to 0.02.

5. The phosphor of claim 1, where M is characterized by the general formula $Mm_{1-a}Mp_a$ where Mm and Mp are independently selected from the group consisting of Ga, Fe, Al and Sc; and a is a number from greater than 0 to about 1.0.

6. A composition characterized by the general formula:

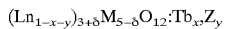

$$(Ln_{1-x-y})_{3+\delta}M_{5-\delta}O_{12}:Tb_x,Z_y$$

where Ln is an element selected from the group consisting of Gd, La, Lu, Y and combinations thereof;

M is an element selected from the group consisting of Al, Ga, Sc, Fe and combinations thereof;

x is greater than or equal to zero, but less than or equal to 0.05;

y is greater than or equal to zero, but less than or equal to 0.05;

Z is Tl;

$\delta$ is greater than or equal to minus 0.5, but less than or equal to 0.5; and the sum of x and y is not equal to zero.

7. The composition of claim 6, where x is about 0.001 and y is about 0.001.

8. The composition of claim 6, where Ln is characterized by the general formula $Lm_{1-z}Y_z$ where Lm is selected from the group consisting of Gd, La or Lu and z is greater than or equal to zero, but less than or equal to 0.02.

9. The composition of claim 6, where M is characterized by the general formula $Mm_{1-a}Mp_a$ where Mm and Mp are independently selected from the group consisting of Ga, Fe, Al and Sc; and a is a number from 0 to about 1.0.

10. A method for storing an image produced by X-ray exposure and releasing the stored image, comprising imagewise exposing a storage screen to radiation of a first wavelength, said storage screen comprised of a storage phosphor comprising oxygen and combined elements satisfying the relationship $$Ln_{3+\delta}M_{5-\delta}:cQ$$

wherein Ln is an element selected from the group consisting of Gd, La, Lu, Y and Combinations thereof;

M is an element selected from the group consisting of Al, Ga, Sc, Fe and combinations thereof;

Q is selected from the group consisting of terbium, samarium, thallium, indium, europium, ytterbium and combinations thereof;

$\delta$ is greater than or equal to minus 0.5, but less than or equal to 0.5; and c is an amount sufficient to produce a phosphor that exhibits a higher luminescence emission intensity than said phosphor absent Q when, after first being exposed to X-rays, the phosphor is stimulated by light of a wavelength ranging from 600 to 1200 nm;

exposing said storage screen to radiation of a second wavelength, thereby causing emission of a third wavelength collecting the radiation of the third wavelength, and producing an image representative of the image pattern initially stored in the storage screen.

11. The method of claim 10, wherein c is in the range of greater than zero, but less than or equal to 3 mole percent of the host phosphor.

12. The method of claim 10, where Q is a combination of terbium and thallium.

13. The method of claim 12, where the ratio of terbium to thallium is 1 to 1.

14. A process for the conversion of penetrating radiation into storage states that may be subsequently optically or thermally released resulting in radiation of a third wavelength, characterized in that said phosphor comprises a garnet compound having the following empirical formula:

$$(Ln_{1-x-y})_{3+\delta}M_{5-\delta}O_{12}:Tb_x,Z_y$$

where Ln is an element selected from the group consisting of Gd, La, Lu, Y and combinations thereof;

M is an element selected from the group consisting of Al, Ga, Sc, Fe and combinations thereof;

x is greater than or equal to zero, but less than or equal to 0.05;

y is greater than or equal to zero, but less than or equal to 0.05;

Z is an element selected from the group consisting of Tl, Sm or Yb;

$\delta$ is greater than or equal to minus 0.5, but less than or equal to 0.5; and the sum of x and y is not equal to zero.

15. The process of claim 14, where Z is Tl.

16. The process of claim 14, where x is about 0.001 and y is about 0.001.

* * * * *

UNITED STATES PATENT AND TRADEMARK OFFICE
CERTIFICATE OF CORRECTION

PATENT NO. : 6,315,923 B1
DATED : November 21, 2001
INVENTOR(S) : Devenney et al.

It is certified that error appears in the above-identified patent and that said Letters Patent is hereby corrected as shown below:

<u>Title page,</u>
Item [73], Assignees, change to read: -- Symyx Technologies, Inc., Santa Clara, CA (US); AGFA-Gevaert, N.V., Mortsel, Belgium --

<u>Column 11,</u>
Line 9, "Combinations" should be replaced with -- combinations --

Signed and Sealed this

Eighteenth Day of March, 2003

JAMES E. ROGAN
*Director of the United States Patent and Trademark Office*